US008517126B2

(12) United States Patent
Atarashi

(10) Patent No.: US 8,517,126 B2
(45) Date of Patent: Aug. 27, 2013

(54) ELECTRIC VEHICLE

(75) Inventor: Hirofumi Atarashi, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/581,703

(22) PCT Filed: Feb. 22, 2011

(86) PCT No.: PCT/JP2011/053868
§ 371 (c)(1),
(2), (4) Date: Aug. 29, 2012

(87) PCT Pub. No.: WO2011/108403
PCT Pub. Date: Sep. 9, 2011

(65) Prior Publication Data
US 2012/0318586 A1  Dec. 20, 2012

(30) Foreign Application Priority Data
Mar. 4, 2010  (JP) ................................. 2010-047626

(51) Int. Cl.
*B60L 9/00* (2006.01)
(52) U.S. Cl.
USPC ............................. 180/2.1; 320/108; 320/109
(58) Field of Classification Search
USPC ................... 180/165, 2.1, 65.1, 65.22, 65.31; 307/104; 320/104, 108, 109
See application file for complete search history.

(56) References Cited

U.S. PATENT DOCUMENTS

| | | | |
|---|---|---|---|
| 5,573,090 A * | 11/1996 | Ross | 191/10 |
| 7,451,839 B2 * | 11/2008 | Perlman | 180/2.1 |
| 8,008,888 B2 * | 8/2011 | Oyobe et al. | 320/108 |
| 8,030,888 B2 * | 10/2011 | Pandya et al. | 320/109 |
| 2012/0032525 A1 | 2/2012 | Oyobe et al. | |

FOREIGN PATENT DOCUMENTS

| | | |
|---|---|---|
| JP | 09-215211 A | 8/1997 |
| JP | 2000-152512 A | 5/2000 |
| JP | 2009-106136 A | 5/2009 |
| JP | 2011-061942 A | 3/2011 |

OTHER PUBLICATIONS

International Search Report and Written Opinion dated May 24, 2011 corresponding to International Patent Application No. PCT/JP2011/053868.
"Medium-Distance Electric Transmission Technology," of EE Times Japan, published Oct. 9, 2009 by E2 Publishing Company, pp. 27-31 and English translation thereof.

* cited by examiner

*Primary Examiner* — John Walters
(74) *Attorney, Agent, or Firm* — Squire Sanders (US) LLP

(57) ABSTRACT

Disclosed is an electric vehicle which receives power from a road surface by means of a wireless connection, in which an optimal configuration of a repeater (which is a resonator) and a receiving coil relative to the vehicle body is clarified. A first coil configuring the repeater forms a first wireless connection with a receiver coil, and a second coil forms a second wireless connection with a transmitting coil. The first coil is proximally arranged below the receiving coil and is aligned with the receiving coil, which is on the top side of a vehicle underbody panel; the second coil is arranged on the bottom side of the vehicle underbody panel. A performance indicator $k*Q$ of the path from the transmitting coil below the road surface to the receiving coil of the electric vehicle is increased.

4 Claims, 5 Drawing Sheets

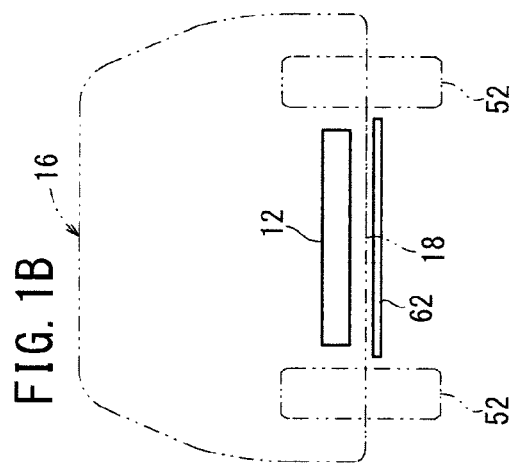
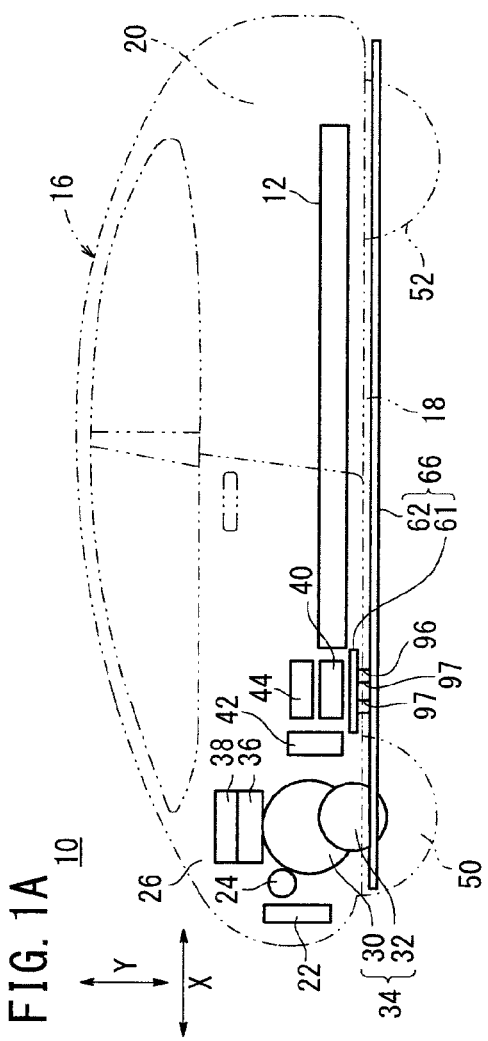
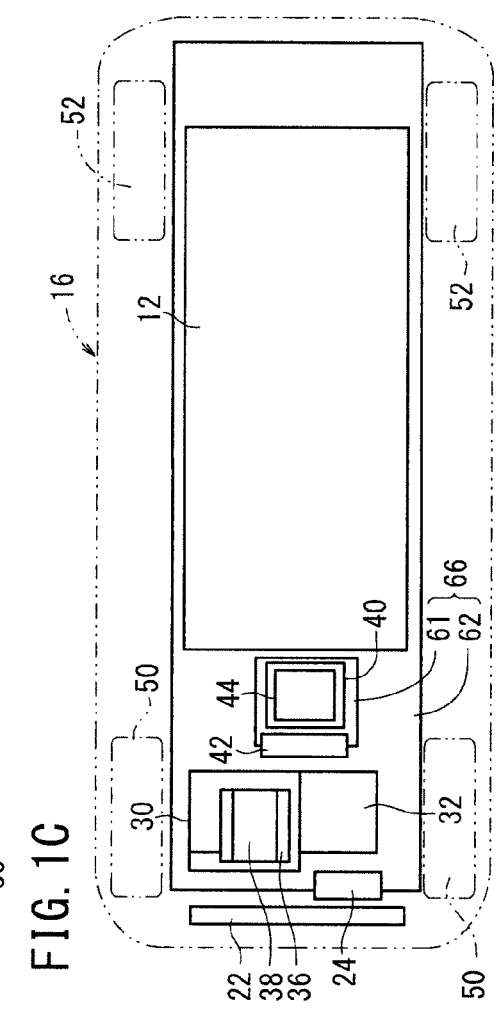

ELECTRIC VEHICLE

TECHNICAL FIELD

The present invention relates to an electric vehicle, which is propelled by drive power from an electric motor that is energized by electric power from an electric storage device, and more particularly, to an electric vehicle which is capable of being charged wirelessly (contactlessly charged).

BACKGROUND ART

Heretofore, electric vehicles have been known that travel based on a rotational torque transmitted to road wheels through a power transmitting mechanism from an electric motor that is energized by electric power from an electric storage device. Problems to be solved in order for such electric vehicles to find widespread use include the relatively small distance that such vehicles can travel with a single charging process performed on the electric storage device, lack of pervasive charging facilities, and long charging times, etc.

Another concern in relation to electric vehicles is that, since electric accessories such as an air conditioner, etc., consume electric power, if the electric vehicle is involved in traffic congestion, then the distance that the electric vehicle can travel tends to be extremely reduced.

Recently, a wired charging process has been proposed for charging the electric storage device on an electric vehicle through a charging cable that interconnects a charging plug on the electric vehicle and a charging stand or a home power supply. If the electric vehicle is to be charged on a daily basis, then it is highly tedious and time-consuming to connect and disconnect connectors on the charging cable.

There have been demands for wireless charging, or stated otherwise, contactless charging, in order to eliminate the above tedious and time-consuming process.

Japanese Laid-Open Patent Publication No. 2009-106136 discloses an electric vehicle (electrically-driven vehicle) that receives charging electric power contactlessly from a power supply outside of the electric vehicle according to a resonance process, which is used to charge an electric storage device in the electric vehicle. Japanese Laid-Open Patent Publication No. 2009-106136 states, in paragraphs [0015], [0033], etc., that a secondary self-resonant coil, which is an LC resonant coil having both ends thereof open, should preferably be disposed in a lower portion of the vehicle body. The patent publication also states (FIG. 1, paragraph [0034]) that a secondary coil (electric receiving coil) should preferably be disposed coaxially with respect to the secondary self-resonant coil (paragraph [0092], FIG. 10), which is disposed in the lower portion of the vehicle body parallel to the electric vehicle.

Wireless coupling (wireless electric transmission) according to a resonant process and wireless coupling according to an electromagnetic induction process are disclosed in "Second Section, Medium-Distance Electric Trans-mission Technology," pages 27 through 31, of "EE TIMES Japan" published Oct. 9, 2009 by E2 Publishing Company (hereinafter referred to as "Non-Patent Document 1"), for example.

Non-Patent Document 1 reveals that if $\omega$ represents an angular frequency, Rohm represents a resistive component, and Rrad represents a radiation resistive component, then a coil index Q concerning energy retained by the coil is expressed by the following equation (1).

$$Q=\{\omega L/(\text{Rohm}+\text{Rrad})\} \tag{1}$$

Non-Patent Document 1 also discloses that if the inductance of an electric transmitting coil is represented by Ls, the inductance of an electric receiving coil is represented by Lr, and the mutual inductance is represented by M, then the coupling strength k between the coils is expressed by the following equation (2).

$$k=M/(Ls \cdot Lr)^{1/2}=(M/\sqrt{Ls \cdot Lr}) \tag{2}$$

Non-Patent Document 1 further discloses that a figure of merit concerning the electric power transmission efficiency of a wireless coupling is expressed as the product of the coupling strength k and the index Q, in accordance with the following equation (3).

$$k \cdot Q=(M/\sqrt{Ls \cdot Lr}) \cdot \{\omega Ls/(\text{Rohm}+\text{Rrad})\} \tag{3}$$

SUMMARY OF INVENTION

The self-resonant coil described in Japanese Laid-Open Patent Publication No. 2009-106136 is an LC resonant coil having both ends thereof open (unconnected). Since the C component (capacitive component) thereof varies significantly depending on how the LC resonant coil actually is installed on the vehicle, circuit and installation design are highly critical (subjected to large limitations). With respect to the layout of the self-resonant coil and the secondary coil (electric receiving coil) in the vehicle, the publication simply describes that the secondary coil (electric receiving coil) should preferably be disposed coaxially with respect to the self-resonant coil, which is disposed in a lower portion of the vehicle body parallel to the electric vehicle.

The present invention has been made in view of the above problems and the disclosure of Non-Patent Document 1. It is an object of the present invention to provide an electric vehicle, which makes it possible to charge an electric storage device with high electric power transmission efficiency, even if there is a certain distance between the electric vehicle and the road surface, by clarifying the optimum layout of a relay (resonator) and an electric receiving coil on the electric vehicle for the purpose of increasing a figure of merit k·Q in a wireless charging process.

According to the present invention, there is provided an electric vehicle propelled by drive power from an electric motor, which is energized by electric power from an electric storage device, comprising an electric receiving coil disposed above a vehicle underfloor panel, for supplying electric power to the electric storage device, and a relay for transmitting electric power from an electric transmitting coil disposed underneath a road surface to the electric receiving coil through at least one of an electromagnetic induction wireless coupling and a resonant wireless coupling. The relay comprises a first coil, a second coil, and a capacitor that jointly constitute a resonant circuit, the first coil and the electric receiving coil jointly constitute a first wireless coupling, the second coil and the electric transmitting coil jointly constitute a second wireless coupling, the first coil is disposed above the vehicle underfloor panel and beneath the electric receiving coil in close proximity thereto, in order to make the coupling strength k (k=M/√L1·Lr, where L1 represents an inductance of the first coil, Lr represents an inductance of the electric receiving coil, and M represents a mutual inductance) of the first wireless coupling greater than the coupling strength k of the second wireless coupling, and the second coil is disposed beneath the vehicle underfloor panel, and an index Q (particularly, an index Q=ωLs/r of the electric transmitting coil concerning energy retained thereby, where ω represents an angular frequency, Ls represents an inductance of the electric transmitting coil, and r represents a sum of a resistive component and a radiation resistive component of the electric transmitting coil) of the second wireless coupling concerning energy retained thereby is greater than an index Q of the first wireless coupling concerning energy retained thereby.

According to the present invention, the index Q concerning energy retained between the electric transmitting coil underneath the road surface and the second coil of the relay, which forms the second wireless coupling in coaction with the electric transmitting coil, is increased, and the first coil of the relay and the electric receiving coil are disposed in close proximity to each other. Therefore, the coupling strength k is increased. Consequently, the figure of merit k·Q of the path from the electric transmitting coil underneath the road surface to the electric receiving coil of the electric vehicle 10 can also be increased. As a result, even if the electric vehicle and the road surface are distant from each other, the electric storage device can be charged with high electric power transmission efficiency through the relay.

The electric receiving coil and the first coil may be aligned coaxially with each other for thereby increasing the coupling strength k.

If the capacitor of the relay is disposed above the vehicle underfloor panel, then the capacitor, which is less durable than the coils, is disposed inside of the electric vehicle. Accordingly, selection of components is facilitated.

According to the present invention, the electric vehicle, which receives electric power from the road surface through magnetic couplings, has a clarified optimum layout made up of the relay as a resonator and the electric receiving coil. As a result, the figure of merit of the path from the electric transmitting coil underneath the road surface to the electric receiving coil is increased. Therefore, even if the vehicle underfloor panel of the electric vehicle and the road surface are distant from each other, the electric storage device can be charged with high electric power transmission efficiency.

BRIEF DESCRIPTION OF DRAWINGS

FIGS. 1A, 1B, and 1C are a side elevational view, a rear elevational view, and a plan view, respectively, showing transparently the layout of major vehicle-mounted components in an electric vehicle according to an embodiment of the present invention;

DESCRIPTION OF EMBODIMENTS

An electric vehicle according to an embodiment of the present invention will be described below with reference to the drawings.

FIGS. 1A, 1B, and 1C are a side elevational view, a rear elevational view, and a plan view, respectively, showing transparently the layout of major vehicle-mounted components in an electric vehicle 10 according to an embodiment of the present invention.

Figure 2:
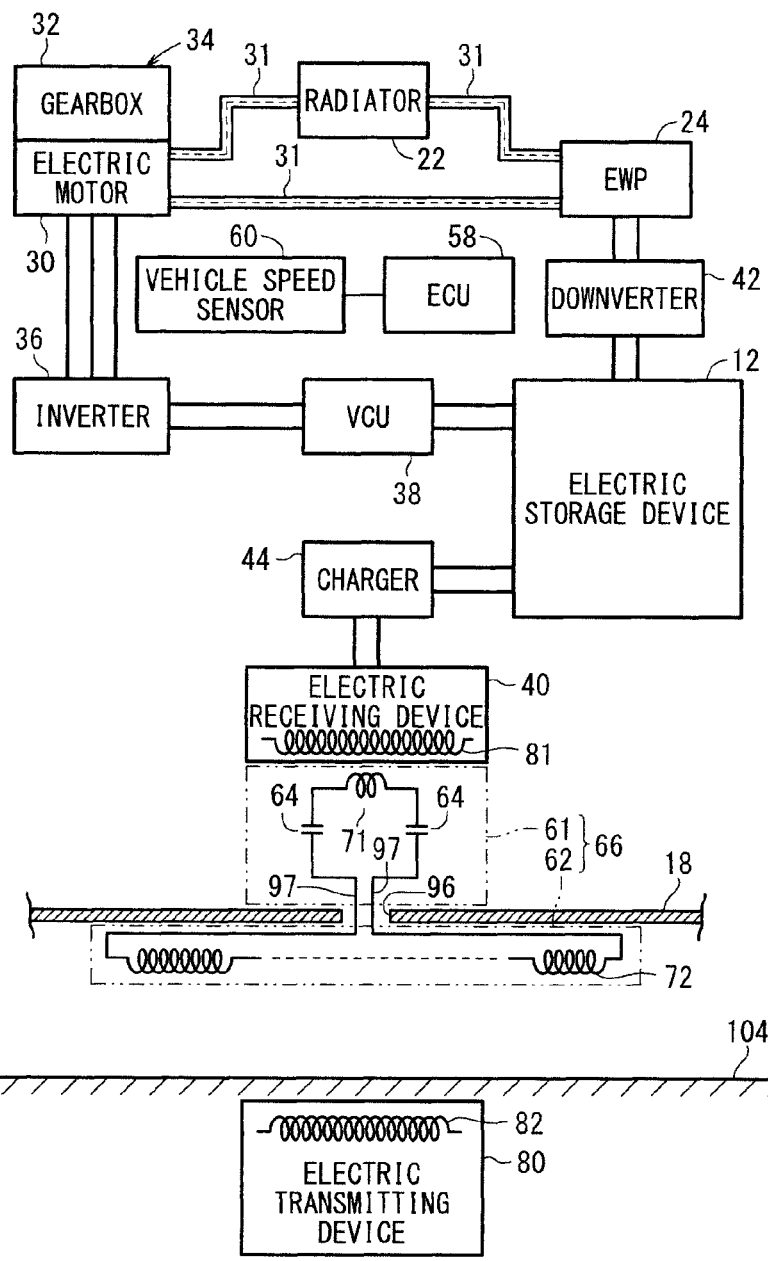
FIG. 2 is a schematic block diagram showing the major vehicle-mounted components, interconnections therebetween, and pipes in the electric vehicle shown in FIGS. 1A, 1B, and 1C.

FIG. 2 is a schematic block diagram showing the vehicle-mounted major components, interconnections therebetween, and pipes in the electric vehicle 10 shown in FIGS. 1A, 1B, and 1C.

As shown in FIGS. 1A, 1B, and 1C, the electric vehicle 10 (vehicle) includes a high-voltage electric storage device 12 such as a lithium ion secondary battery, a capacitor, or the like. The electric storage device 12, which has a thin shape in the form of a rectangular parallelepiped, extends from a position beneath the front seats along an underfloor panel (vehicle underfloor panel) 18 of a vehicle body 16 to a rear trunk 20.

A radiator 22 is disposed behind a front grill of the vehicle body 16. An EWP (Electric Water Pump) 24 is disposed behind the radiator 22 and is offset therefrom in a transverse direction of the vehicle body 16 (see FIG. 1C). When the EWP 24 is actuated, a coolant flows through a pipe 31 (see FIG. 2), which extends through the radiator 22 and an electric motor 30. The coolant performs heat exchange in the radiator 22 and cools the electric motor 30.

A chamber 26, which is defined in a front portion of the vehicle body 16 beneath the engine hood, houses therein a motor power mechanism 34, which comprises an integral assembly of the electric motor 30 and a gearbox 32.

The electric motor 30 has an output shaft (not shown) connected to a gear train (not shown) in the gearbox 32. The gear train causes a drive shaft (not shown) to rotate front road wheels 50. The front road wheels 50 serve as drive wheels, whereas the rear road wheels 52 are driven wheels.

Rotation of the front road wheels 50 is detected by a rotational speed sensor (not shown). An output signal from the rotational speed sensor is read into an ECU 58 as an output signal of a vehicle speed sensor 60 (see FIG. 2), i.e., a vehicle speed V [km/h]. The ECU 58 includes a CPU, a ROM, and a RAM, and executes various programs stored in the ROM to carry out control processes in relation to all of the components mounted in the electric vehicle 10, e.g., to perform a control process for charging and discharging the electric storage device 12.

As shown in FIG. 1A, an inverter 36 and a VCU (Voltage Control Unit) 38 are disposed above the motor power mechanism 34.

A relay (resonator) 66 for transmitting and receiving electric power by way of a wireless coupling comprises a first coil capacitor unit 61, which is disposed on an upper surface of the underfloor panel 18 and beneath a floor (not shown) of the vehicle, or within the engine compartment, and a second coil unit 62, which is disposed on a lower surface of the underfloor panel 18. The relay 66 is separately disposed vertically above and beneath the underfloor panel 18 of the vehicle body 16.

The second coil unit 62 and the first coil capacitor unit 61 are connected to each other by two electric wires 97 that extend through a small opening 96 defined in the vehicle underfloor panel 18 (see FIGS. 1A and 2).

The first coil capacitor unit 61 is disposed beneath an electric receiving device 40 in confronting relation thereto. A charger 44 is disposed above the electric receiving device 40. The first coil capacitor unit 61 is disposed beneath a downverter 42 and parallel to the electric receiving device 40 and the charger 44.

Figure 3:
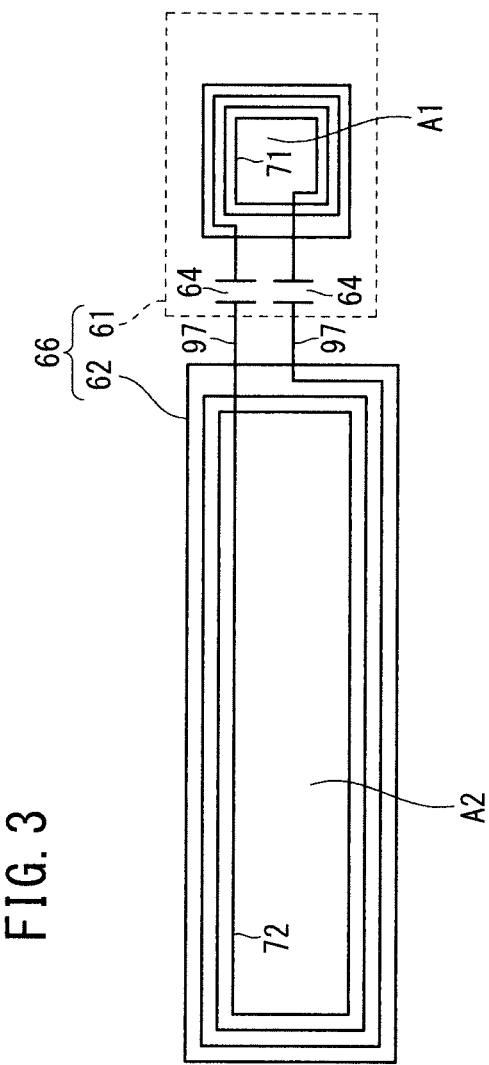
FIG. 3 is a view showing an actual configuration of a relay.

FIG. 3 shows an actual configuration of the relay 66. As described above with reference to FIGS. 1A and 2, the relay 66 includes the second coil unit 62, which has a thin shape in the form of a rectangular parallelepiped, extending substantially fully underneath the vehicle underfloor panel 18 of the vehicle body 16, and the first coil capacitor unit 61, which is in the form of a rectangular parallelepiped disposed above the vehicle underfloor panel 18.

The second coil unit 62 has a second coil 72 made of multiple turns of a thermal-fusion electric wire along four inner wall surfaces (side surfaces of the rectangular parallelepiped) thereof. The second coil unit 62 is entirely encased within a resin molding, which also has a thin shape in the form of a rectangular parallelepiped, for fixing the second coil 72 in position and securing the second coil 72 to the lower surface of the underfloor panel 18.

The height of the wall surfaces of the second coil unit 62 (the height along the Y direction in FIG. 1A) is small. The second coil unit 62 has a given number of turns and defines a large second closed-path area A2 as a spatial area. If the second coil 72 is considered as a finite-length solenoid, then it is understandable that the inductance of the second coil 72 of the relay 66 can be increased.

The first coil capacitor unit 61 includes a first coil 71, which also has a thin shape in the form of a rectangular parallelepiped, similar to the second coil 72. The first coil 71 comprises multiple turns of thermal-fusion electric wire along four inner wall surfaces of the rectangular parallelepiped shape thereof. The first coil capacitor unit 61 is encased within a resin molding for securing the first coil 71 to the underfloor panel 18.

With the electric vehicle 10 according to the present embodiment, the second closed-path area A2, which is defined by the second coil 72 as a central area that is free of electric wires, is greater than a first closed-path area A1, which is defined by the first coil 71 as a central area that is free of electric wires. The first coil 71 is axially aligned with an electric receiving coil 81 of the electric receiving device 40, and is disposed in close confronting relation to the electric receiving coil 81 (see FIGS. 1A and 1C).

As shown in FIG. 3, the first coil capacitor unit comprises a series-connected circuit made up of the first coil 71 and two capacitors 64. The two capacitors 64 may be combined into a single capacitor.

As described above, the first coil capacitor unit 61 and the second coil unit 62 are connected to each other by the two electric wires 97, which extend through the small opening 96 defined in the vehicle underfloor panel 18, such that the first and second coils 71, 72 and the capacitors 64 make up a closed resonant circuit.

If the series-connected capacitors 64 have a combined capacitance C and the first and second coils 71, 72 have a combined inductance L, then the relay 66, which acts as a resonator, has a resonant frequency f0 of $1/2\pi\sqrt{LC}$ ($f0 = 1/2\pi\sqrt{LC}$).

Figure 4:
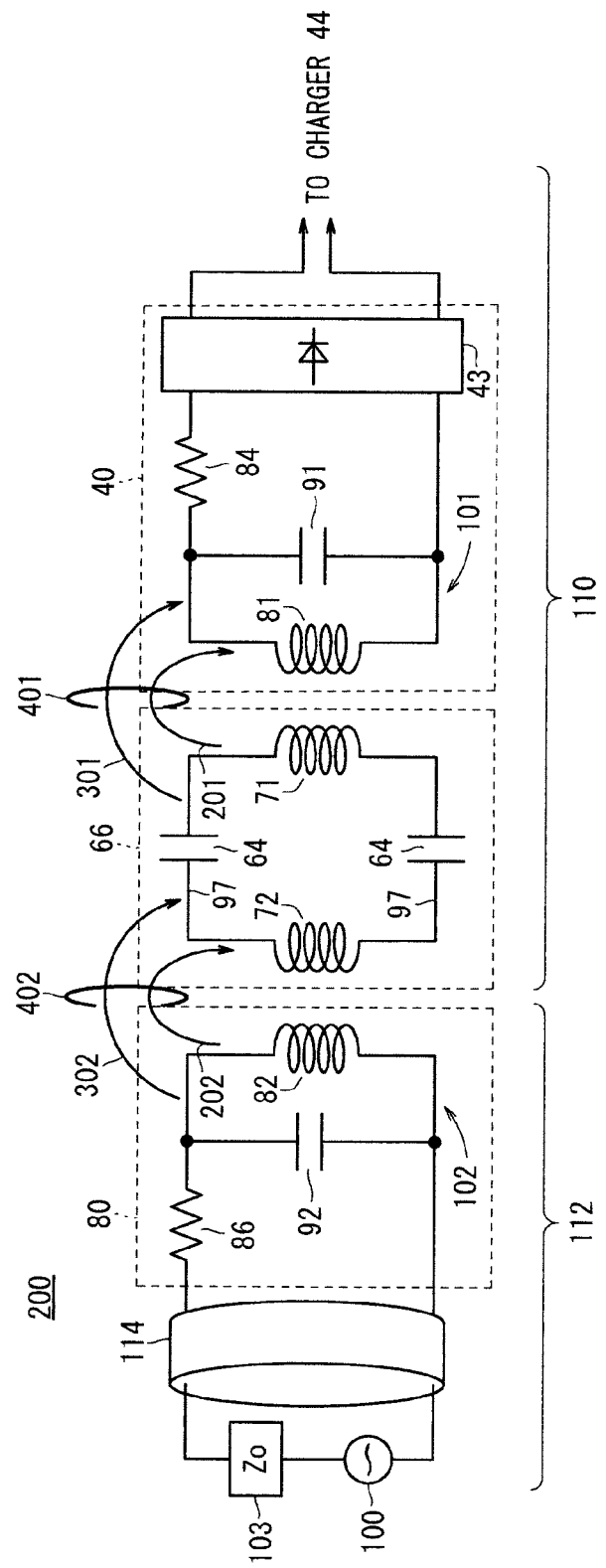
FIG. 4 is a circuit diagram of a wireless coupling electric transmitting and receiving system.

FIG. 4 is a circuit diagram of a wireless coupling electric transmitting and receiving system 200. As shown in FIG. 4, the wireless coupling electric transmitting and receiving system 200 comprises a road infra-unit 112 (vehicle-bearing infra-unit) disposed underneath a road surface 104 (see FIG. 2), and a vehicular electric receiver 110 disposed in a lower portion of the vehicle body 16 of the electric vehicle 10.

The vehicular electric receiver 110 includes the relay 66 and the electric receiving device 40.

The road infra-unit 112 comprises a high-frequency power supply 100 having the above resonant frequency f0, e.g., a frequency of about f0=10 [MHz], a signal characteristic impedance 103, an electric transmitting device 80, and a coaxial cable 114 having a characteristic impedance Zo, and which interconnects the high-frequency power supply 100, the signal characteristic impedance 103, and the electric transmitting device 80.

The electric transmitting device 80 comprises a terminating resistor 86 and a resonator 102 including a capacitor 92 and an electric transmitting coil 82. The resonator 102 has a resonant frequency that is equal to the resonant frequency f0.

As described above with reference to FIGS. 2 and 3, the relay 66 of the vehicular electric receiver 110 is constructed as a relay (having the resonant frequency f0), which is made up of the first coil 71, the second coil 72, and the capacitors 64.

The electric receiving device 40 of the vehicular electric receiver 110 comprises a resonator 101 (resonator) with the resonant frequency f0, which includes the electric receiving coil 81 and a capacitor 91, a damping resistor 84, and a rectifier 43 for supplying a DC voltage to the charger 44.

While the electric vehicle 10 is held at rest in an electric transmitting and receiving mode, the electric vehicle 10 is positioned on the road surface 104 such that the closed-path area of the electric transmitting coil 82 of the electric transmitting device 80 and the closed-path area of the second coil 72 of the relay 66 confront each other and preferably are aligned coaxially with each other. If a succession of road infra-units 112 are provided underneath the road surface 104, then the electric vehicle 10 can also operate in an electric transmitting and receiving mode when the electric transmitting coil 82 and the second coil 72 confront each other during times that the electric vehicle 10 is traveling.

The first coil 71 of the relay 66 and the electric receiving coil 81 of the electric receiving device 40 are aligned coaxially with each other, have essentially the same diameter as each other, have as large a closed-path area as possible, and are disposed in close proximity to each other. Therefore, the first coil 71 and the electric receiving coil 81 have a large coupling strength k therebetween, i.e., [[k=M(L1·Lr)$^{1/2}$= M√L1·Lr]]k=M/(L1·Lr)$^{1/2}$=M/√L1·Lr, where L1 represents the inductance of the first coil 71, Lr represents the inductance of the electric receiving coil 81, and M represents the mutual inductance.

Operations of the electric vehicle 10, which incorporates the wireless coupling electric transmitting and receiving system 200 constructed basically as described above, will be described below with reference to FIG. 5, which shows an interlinked state of magnetic fluxes.

The electric storage device 12 is charged while the electric vehicle 10 is traveling on a road in which a succession of electric transmitting devices 80 of road infra-units 112 are disposed below and near the road surface (road surface) 104.

The electric storage device 12 also is charged when the electric transmitting coil 82 of the electric transmitting device 80 and the second coil 72 of the relay 66 are disposed in confronting relation to each other, and preferably in coaxial alignment with each other, with the relay 66 being positioned directly above the electric transmitting device 80 while the electric vehicle 10 is held at rest.

The road infra-unit 112 may be installed in a public or private parking space. Therefore, while the electric vehicle 10 is parked or stopped in such a public or private parking space, which is equipped with the electric transmitting device 80 of the road infra-unit 112, the electric storage device 12 on the electric vehicle 10 can be charged when the electric transmitting coil 82 of the electric transmitting device 80 and the second coil 72 of the relay 66 are disposed in confronting relation and in coaxial alignment with each other.

When the high-frequency power supply 100 is energized for charging, high-frequency electric power from the high-frequency power supply 100 is supplied through the coaxial cable 114 to the electric transmitting device 80. When the resonator 102 of the electric transmitting device 80 is excited by high-frequency electric power, a large resonant current flows with a large inductance into the resonator 102, which includes the capacitor 92 and the electric transmitting coil 82, thereby generating lines 122 of magnetic flux (see FIG. 5) and retaining resonant energy.

As shown in FIG. 4, the relay 66 is excited by a second wireless coupling 402, which comprises at least one of a wireless coupling 202 according to an electromagnetic induction process and a wireless coupling 302 according to a resonant process, based on the lines 122 of magnetic flux. At this time, high-frequency electric power is transmitted from the resonator 102 of the electric transmitting device 80 underneath the road surface 104, and the high-frequency electric power is received by the relay 66 of the vehicular electric receiver 110.

Figure 5:
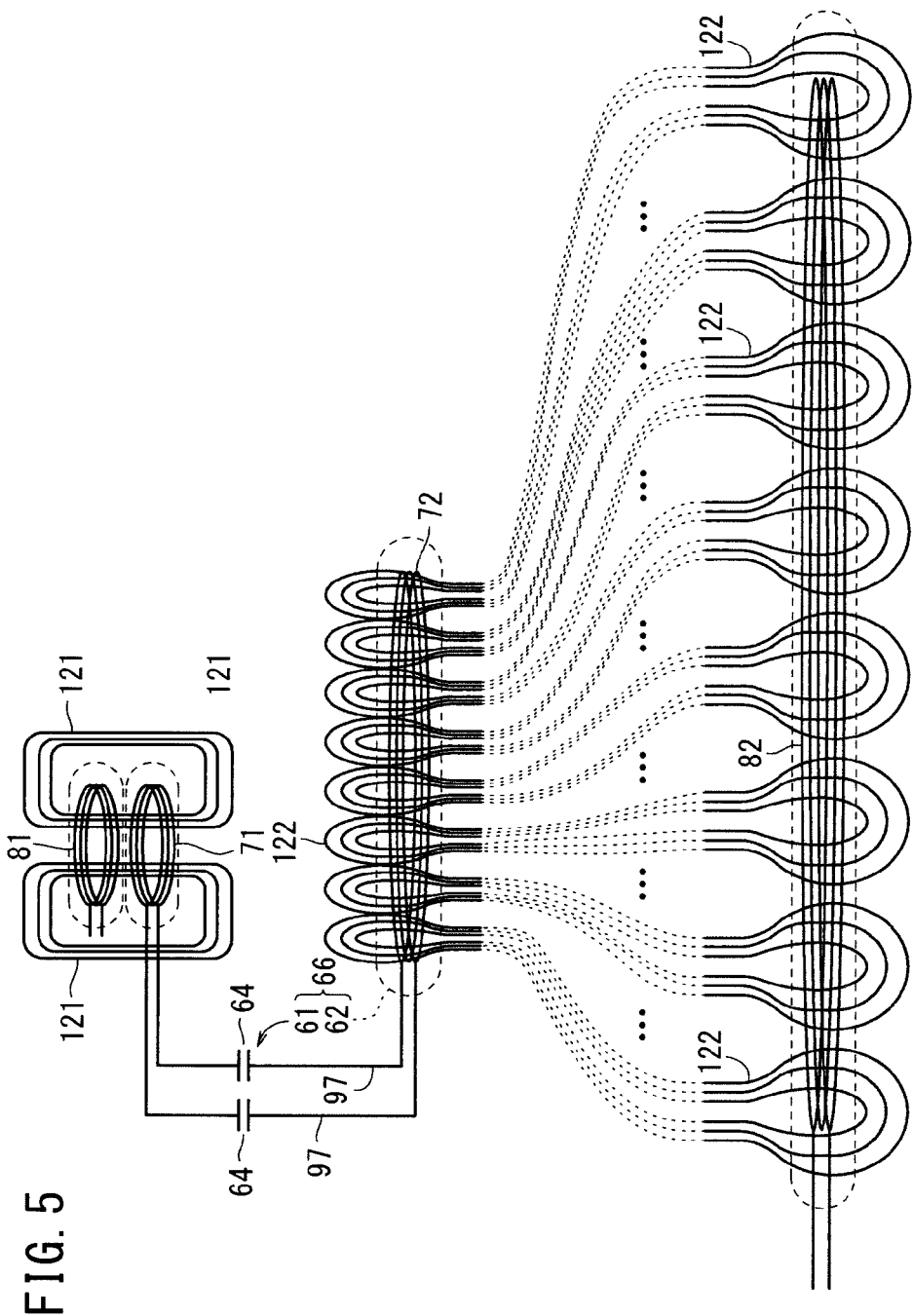
FIG. 5 is a schematic view showing an interlinked state of magnetic fluxes.

FIG. 5 schematically illustrates the manner in which the electric transmitting coil 82 and the second coil 72 are coupled to each other through the lines 122 of magnetic flux.

Since the electric transmitting coil 82 of the electric transmitting device 80, which is disposed underneath the road surface 104, and the second coil 72 of the relay 66, which is disposed on the vehicle underfloor panel outside of the vehicle body 16, are spaced from each other by a relatively large distance and have a small mutual inductance, the coupling strength k therebetween is small. However, since the respective inductances of the electric transmitting coil 82 and the second coil 72 are large, the index $Q=\omega Ls/r$ (in particular, the index of energy retained by the electric transmitting coil 82, where $\omega$ represents an angular frequency, Ls represents the inductance of the electric transmitting coil 82, and r represents the sum of a resistive component and a radiation resistive component of the electric transmitting coil 82) is large. Inasmuch as the respective retained energies are large, the efficiency at which electric power is transmitted from the electric transmitting device 80 to the relay 66 is increased. The indexes Q of the second coil 72 and the first coil 71 of the relay 66 (the inductance value of the second coil 72>the inductance value of the first coil 71) also are required to be large. In other words, it is necessary to increase inductive components and to reduce resistive components as much as possible in order to maximize retained energies and to minimize electric power losses caused by the resistive components when high-frequency current flows through the relay 66.

A process of transmitting and receiving electric power between the relay 66 and the electric receiving device 40 will be described below. Interlinking lines 121 of magnetic flux between the first coil 71 of the relay 66 disposed above the vehicle underfloor panel 18 (i.e., inside the vehicle body 16) and the electric receiving coil 81 of the electric receiving device 40 provide a large coupling strength k , i.e., [[k=M (L1·Lr)$^{1/2}$=M√L1·Lr]]k=M(L1·Lr)$^{1/2}$=M√L1·Lr where L1 represents the inductance of the first coil 71, Lr represents the inductance of the electric receiving coil 81, and M represents the mutual inductance, because the first coil 71 and the electric receiving coil 81 are positioned in close proximity to each other. As a result, due to the high mutual inductance therebetween, the first coil 71 and the electric receiving coil 81 are coupled to each other highly efficiently by an electromagnetic induction wireless coupling 201 based on the lines 121 of magnetic flux. Furthermore, the relay 66 and the resonator 101 of the electric receiving device 40 are coupled to each other by a resonance wireless coupling 301. In other words, the relay 66 and the resonator 101 are coupled to each other by the first wireless coupling 401, which comprises at least one of the electromagnetic induction wireless coupling 201 and the resonance wireless coupling 301.

Since the indexes Q of the second coil 72 and the first coil 71 of the relay 66, which function as electric transmitting coils, are high, the resonance wireless coupling 301 is capable of transmitting electric power highly efficiently.

Therefore, electric power is transmitted from the relay 66 to the electric receiving device 40 by the first wireless coupling 401, which comprises at least one of the electromagnetic induction wireless coupling 201 based on the lines 121 of magnetic flux and the resonance wireless coupling 301, and the electric power is received by the electric receiving device 40.

Since the figure of merit k·Q of the relay 66 is large, the overall electric power transmission efficiency at which electric power is transmitted from the electric transmitting device 80 underneath the road surface 104, through the relay 66 outside of the vehicle body 16, and to the electric receiving device 40 within the vehicle body 16 is kept high.

A voltage developed across the resonator 101 of the electric receiving device 40 is applied through the resistor 84 to the rectifier 43, which converts the voltage into a DC voltage. The DC voltage then is applied to the charger 44, which charges the electric storage device 12. If necessary, a DC/DC booster converter may be connected to an input side of the charger 44.

While the electric vehicle 10 is traveling, a high DC voltage, which is output from the charged electric storage device 12, is converted by the VCU 38 into a higher DC voltage, which is converted by the inverter 36 into a three-phase AC drive signal to energize the electric motor 30. Rotational torque (rotation) generated by the electric motor 30 is transmitted through the gearbox 32 and a drive shaft to the front road wheels 50, thereby propelling the electric vehicle 10. Regenerative electric power generated by the electric motor 30 is supplied through the VCU 38 in order to charge the electric storage device 12.

The high DC voltage from the charged electric storage device 12 is converted by the downverter 42 into a lower DC voltage, which is supplied to the EWP 24. The EWP 24 circulates a coolant for carrying out heat exchange for cooling the electric motor 30 through the radiator 22. The gearbox 32 is cooled by oil that is splashed up by rotation of the electric motor 30. The oil is cooled by a pipe inside the electric motor 30 through which the coolant flows.

As described above, the electric vehicle 10 according to the present embodiment is propelled by drive power from the electric motor 30, which is energized by electric power from the electric storage device 12.

The electric vehicle 10 includes the electric receiving coil 81, which is disposed above the vehicle underfloor panel 18 for supplying electric power to the electric storage device 12, and the relay 66 for transmitting electric power from the electric transmitting coil 82, which is disposed underneath the road surface 104, to the electric receiving coil 81 through the second wireless coupling 402 and the first wireless coupling 401. The second wireless coupling 402 and the first wireless coupling 401 each comprise at least one of an electromagnetic induction wireless coupling and a resonant wireless coupling.

The relay 66 includes a resonant circuit made up of the first coil 71, the second coil 72, and the capacitors 64. The first coil 71 and the electric receiving coil 81 jointly constitute the first wireless coupling 401, and the second coil 72 and the electric transmitting coil 82 jointly constitute the second wireless coupling 402.

In order to increase the coupling strength k (k=M/√L1·Lr) of the first wireless coupling 401 and the coupling strength k (k=M'/√Ls·L2) of the second wireless coupling 402, the first coil 71 is disposed above the vehicle underfloor panel 18 and beneath the electric receiving coil 81.

The second coil 72 is disposed beneath the lower surface of the vehicle underfloor panel 18. The index Q of the second wireless coupling 402 concerning energy retained thereby (in particular, the index $Q=\omega Ls/r$ of the electric transmitting coil 82 concerning energy retained thereby, where $\omega$ represents an angular frequency, Ls represents the inductance of the electric transmitting coil 82, and r represents the sum of a resistive component and a radiation resistive component of the electric transmitting coil 82) is higher than the index Q of the first wireless coupling 401 concerning energy retained thereby (in particular, the index $Q=\omega(L2+L1)/r$ of the second coil 72 and the first coil 71 on the transmission side concerning energy retained thereby).

According to the present embodiment, since the index Q of the electric transmitting coil 82 underneath the road surface 104 and the second coil 72 of the relay 66 of the second wireless coupling 402 concerning energy retained therebetween is increased, and the first coil 71 of the relay 66 and the electric receiving coil 81 of the electric receiving device 40 are positioned in close proximity to each other, the coupling strength k is increased. As a result, even if the electric vehicle 10 and the road surface 104 are distant from each other, the electric storage device 12 can be charged through the relay 66 with high electric power transmission efficiency. Consequently, the figure of merit k·Q of the path from the electric transmitting coil 82 underneath the road surface 104 to the electric receiving coil 81 of the electric vehicle 10 can be increased.

Since the electric receiving coil 81 and the first coil are aligned coaxially with each other, the coupling strength k is increased.

In order to increase the coupling strength k of the first wireless coupling 401, the first coil 71 is disposed above the vehicle underfloor panel 18 and below the electric receiving coil 81 in close coaxial alignment with the electric receiving coil 81. In order to increase the index Q of the resonant circuit of the second wireless coupling 402, the second coil 72 is disposed underneath the vehicle underfloor panel 18, while additionally, the closed-path area A2 defined by the second coil 72 is greater than the closed-path area A1 defined by the first coil 71.

The wireless coupling electric transmitting and receiving system 200, which is incorporated in the electric vehicle 10, is constructed as described above. Since the inductance of the second coil 72 is increased, the index Q of the relay 66 is increased. Furthermore, since the first coil 71 and the electric receiving coil 81 are disposed in proximity to each other, the coupling strength k is increased. As a consequence, the figure of merit k·Q, which contributes to the wireless coupling between the electric transmitting device 80 and the electric receiving device 40, is increased.

Inasmuch as the capacitors 64 of the relay 66 are disposed above the vehicle underfloor panel 18, capacitors, which are less durable than coils, are disposed within the vehicle. Accordingly, the selection of components is facilitated.

According to the present embodiment, the electric vehicle 10, which receives electric power from the road surface 104 through the wireless couplings 402, 401, has a clarified optimum layout of the relay 66 as a resonator and the electric receiving coil 81. As a result, the figure of merit k·Q is increased. Even if the vehicle underfloor panel 18 of the electric vehicle 10 and the road surface 104 are distant from each other, the electric storage device 12 can be charged through the relay 66 with high electric power transmission efficiency.

The present invention is not limited to the above embodiment. The present invention also is applicable to a hybrid vehicle including an electric motor and an engine in combination. Various other arrangements can also be adopted based on the descriptive content of the present invention.

The invention claimed is:

1. An electric vehicle propelled by drive power from an electric motor, which is energized by electric power from an electric storage device, comprising:
    an electric receiving coil disposed above a vehicle underfloor panel, for supplying electric power to the electric storage device; and
    a relay for transmitting electric power from an electric transmitting coil disposed underneath a road surface to the electric receiving coil through at least one of an electromagnetic induction wireless coupling and a resonant wireless coupling, wherein:
    the relay comprises a first coil, a second coil, and a capacitor that jointly constitute a resonant circuit;
    the first coil and the electric receiving coil jointly constitute a first wireless coupling;
    the second coil and the electric transmitting coil jointly constitute a second wireless coupling;
    the first coil is disposed above the vehicle underfloor panel and beneath the electric receiving coil in close proximity thereto, in order to make a coupling strength k of the first wireless coupling greater than a coupling strength k of the second wireless coupling; and
    the second coil is disposed beneath the vehicle underfloor panel, and an index Q of the second wireless coupling concerning energy retained thereby is greater than an index Q of the first wireless coupling concerning energy retained thereby.

2. The electric vehicle according to claim 1, wherein the electric receiving coil and the first coil are aligned coaxially with each other.

3. The electric vehicle according to claim 2, wherein the capacitor of the relay is disposed above the vehicle underfloor panel above which the first coil is disposed.

4. The electric vehicle according to claim 1, wherein the capacitor of the relay is disposed above the vehicle underfloor panel above which the first coil is disposed.

* * * * *